United States Patent [19]

Hehr

[11] 4,029,151
[45] June 14, 1977

[54] STONE GATHERER WITH DISCHARGE CONVEYOR

[76] Inventor: Herbert Hehr, Rte. 1, Fredonia, N. Dak. 58440

[22] Filed: Jan. 16, 1976

[21] Appl. No.: 649,793

[52] U.S. Cl. .................................................. 171/65
[51] Int. Cl.² ........................................ A01B 43/00
[58] Field of Search ................. 171/63, 64, 65, 115; 56/34

[56] References Cited
UNITED STATES PATENTS

| | | | |
|---|---|---|---|
| 3,067,561 | 12/1962 | Jezek | 56/34 |
| 3,719,233 | 3/1973 | Hehr | 171/65 |

*Primary Examiner*—Russell R. Kinsey
*Attorney, Agent, or Firm*—Clarence A. O'Brien; Harvey B. Jacobson

[57] ABSTRACT

A mobile frame including a generally frusto-conical ground wheel journaled for rotation about a generally horizontal but inclined transverse axis with the lowermost slant height of the wheel disposed for surface-to-surface contact with the ground over which the frame is advanced. The minor and major diameter ends of the wheel are open and closed, respectively, and an upstanding rotary disk is journaled from the frame for rotation about an axis generally paralleling the axis of rotation of the wheel and with the disk disposed closely outwardly of and closing the rear lower quadrant portion of the open minor diameter on the end of the wheel. Stone deflecting structure is positioned outwardly of the minor diameter end of the wheel for deflecting windrowed stones thereinto and the interior of the wheel includes lift members for support of rocks therefrom and thereby operative to elevate rocks received into the open end of the wheel upon rotation of the latter. The frame includes an inclined longitudinally slotted slide upon which stones elevated to the upper periphery of the wheel are discharged and the slots in the slide taper toward the upper ends thereof. In addition, the outer periphery of the wheel defines a plurality of dirt and small pebble openings spaced thereabout.

12 Claims, 7 Drawing Figures

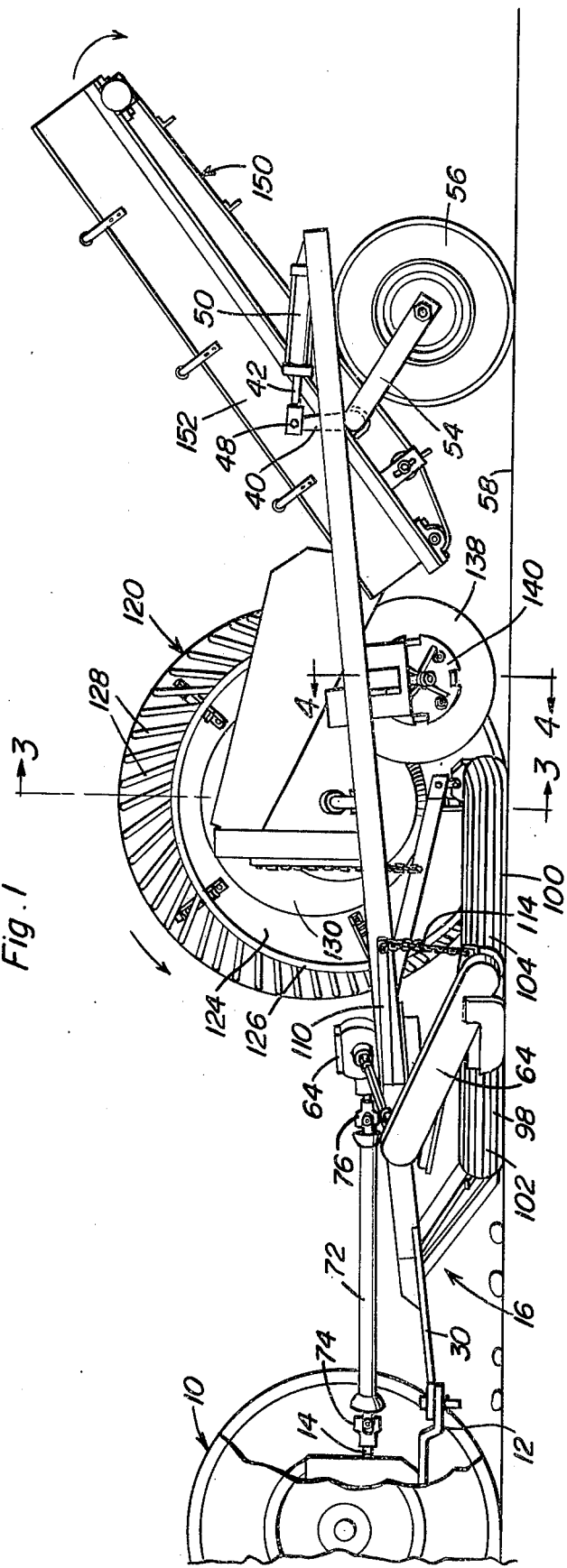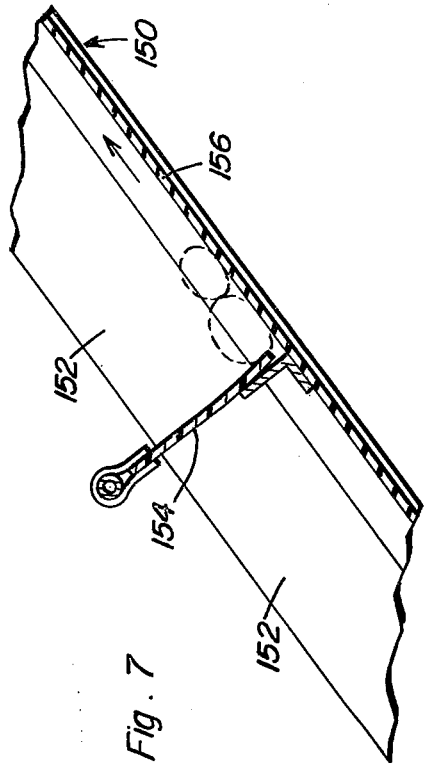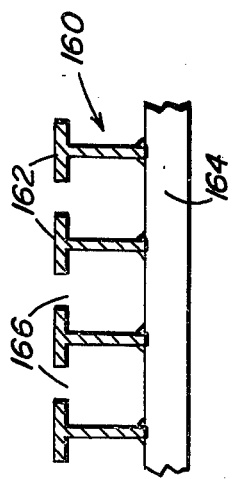

STONE GATHERER WITH DISCHARGE CONVEYOR

This invention comprises an improvement over the stone gatherer disclosed in my prior U.S. Pat. No. 3,719,233, dated Mar. 6, 1973.

BACKGROUND OF THE INVENTION

The stone gatherer disclosed in my above noted prior patent functions substantially as intended but will occasionally experience jamming of large stones in the lower rear quadrant thereof and is not wholly efficient in separating dirt and small pebbles from the rocks and large stones which are gathered and deposited onto the conveyor of the stone gatherer.

BRIEF DESCRIPTION OF THE INVENTION

The improved stone gatherer of the instant invention includes a discharge slide for receiving stones elevated by the wheel of the stone gatherer and the slide is constructed in a manner to allow dirt and small pebbles to fall therethrough and to prevent pebbles from becoming jammed in the longitudinal dirt and small pebble separating slots defined by the slide. In addition, the frusto-conical wheel of the instant invention includes a frusto-conical inner portion whereby only the outer portion of the interior of the wheel is open for the reception of stones therein. Also, the lower rear quadrant of the upper side of the frusto-conical wheel is closed by a rotatable spring mounted disk to prevent jamming of the wheel by larger stones displaced thereinto.

The main object of this invention is to provide a stone gathering apparatus of simple construction and which will be efficient in picking up windrowed stones.

Another object of this invention is to provide a stone gatherer in accordance with the immediately preceding object and including a minimum of driven components which may be readily driven from a tractor behind which the stone gatherer is drawn.

Still another object of this invention is to provide a stone gatherer which may be readily transported from one location to another.

Another object of this invention is to provide a stone gatherer that will be capable of efficiently separating dirt and small pebbles from stones gathered thereby.

A final object of this invention to be specifically enumerated herein is to provide a stone gatherer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts therethrough.

BRIEF DESCRIPTION OF THE DRAWINGS

FIG. 1 is a side elevational view of the stone gatherer of the instant invention and in a position drawn behind a tractor;

FIG. 6 is an enlarged fragmentary transverse sectional view illustrating the structure of the longitudinally slotted inclined slide structure of the stone gatherer; and FIG. 7 is an enlarged fragmentary longitudinal vertical sectional view taken substantially upon the plane indicated by the section line 7—7 of FIG. 2.

DETAILED DESCRIPTION OF THE INVENTION

Figure 2:
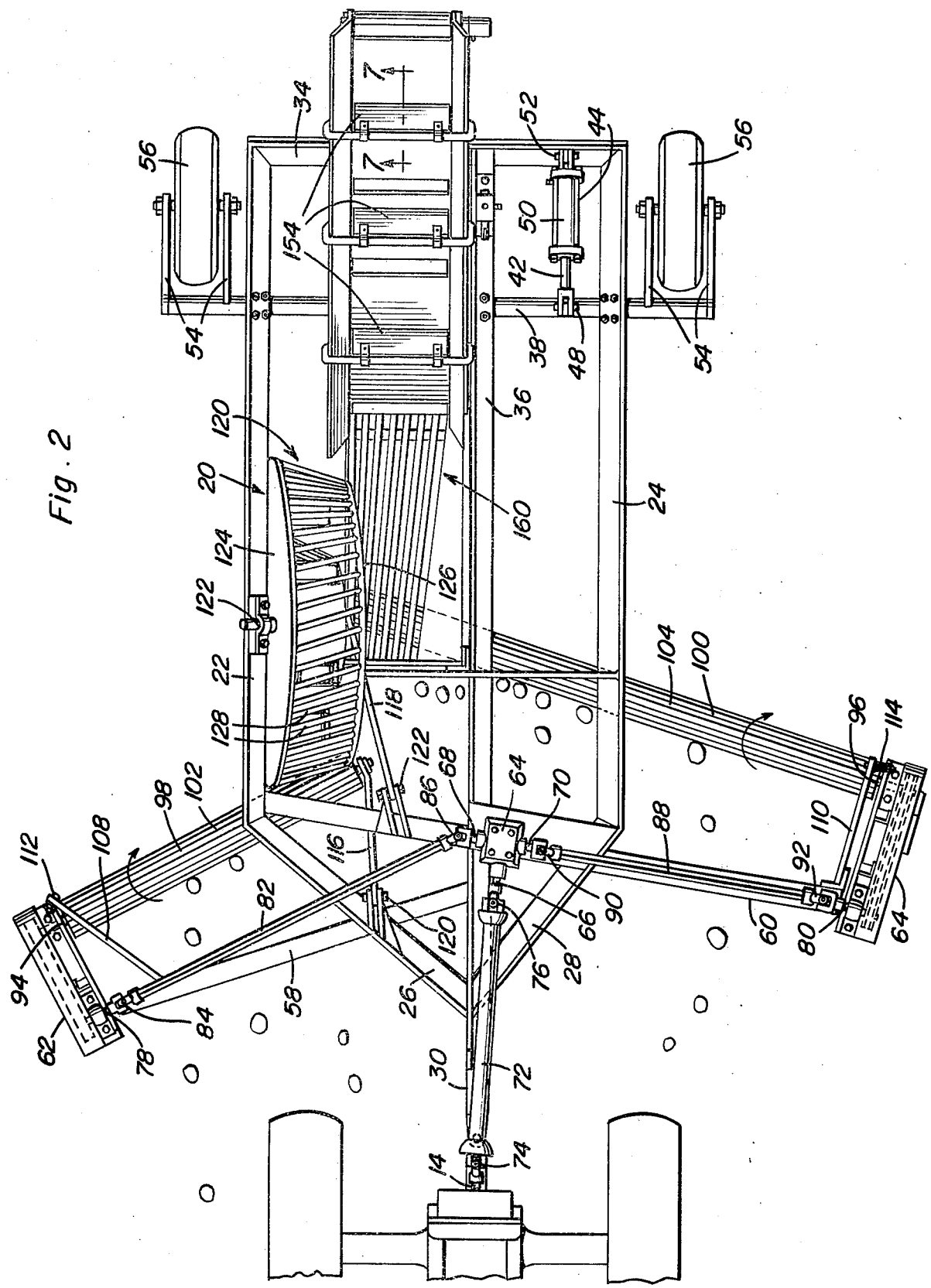
FIG. 2 is a top plan view of the assemblage illustrated in FIG. 1.

Referring now more specifically to the drawings, the numeral 10 generally designates a farm tractor including a tow hitch 12 and a power take off shaft 14. The stone gatherer of the instant invention is referred to in general by the reference numeral 16 and includes a main frame 20 having opposite side longitudinal members 22 and 24 joined together at their forward ends by forwardly convergent members 26 and 28. The frame 20 further includes a central forwardly projecting towing tongue 30 suitably coupled to the hitch 12.

The rear ends of the members 22 and 24 are interconnected by means of a transverse rear member 34 and the frame 20 further includes a generally central longitudinal member 36 extending rearwardly from the rear end of the tongue 30 to the transverse member 34, the forward ends of the members 26 and 28 being secured to the front end of the member 36.

A rear transverse crank axle 38 is oscillatably supported from the members 22, 24 and 26 and includes a crank arm 40 to which the free end of the piston rod portion 42 of a hydraulic cylinder 44 is pivotally attached as at 48. The cylinder or motor 44 includes a cylinder portion 50 and the end of the portion 50 remote from the piston rod portion 42 is pivotally supported from the member 34 as at 52. In addition, the opposite ends of the shaft 38 includes pairs of longitudinally spaced parallel crank arms 54 which extend downwardly and rearwardly from the shaft 38. Each pair of crank arms 54 has a ground engaging support wheel 56 journaled between the lower rear ends thereof for support of the frame 20 from the ground 58 over which the gatherer 16 is being pulled by the tractor 10.

The forward portion of the frame 20 includes a pair of opposite side outwardly projecting and forwardly inclined support arms 58 and 60 from whose outer ends a pair of pulley drive assemblies 62 and 64 are oscillatably supported for angular displacement about axes extending generally longitudinally of the support arms 58 and 60. A gear box 64' including an input shaft 66 and a pair of output shafts 68 and 70 is supported from the forward portion of the frame 20 and a drive shaft 72 connected to the output shaft 14 at one end by means of a universal joint 74 and the input shaft 66 at its other end by means of a universal joint 76 drivingly connects the output shaft 14 to the input shaft 66. In addition, the pulley drive assemblies 62 and 64 include input shafts 78 and 80, respectively, and a drive shaft 82 having universal joints 84 and 86 on its opposite ends drivingly connects the output shaft 68 with the input shaft 78 while a drive shaft 88 having universal joints 90 and 92 on its opposite ends drivingly connects the shaft 70 with the shaft 80. The assemblies 62 and 64 include output shafts 94 and 96 comprising stub axle portions carried by the outer remote ends of a pair of opposite side outwardly projecting and forwardly divergent generally horizontal rollers 98 and 100 provided with longitudinal flutes 102 and 104.

The outer ends of the support arms 58 and 60 include rearwardly projecting supportive arms 108 and 110, respectively, and a pair of flexible chain link sections 112 and 114 support the rear ends of the pulley drive assemblies 62 and 64 from the rear ends of the supportive arms 108 and 110. Further, the adjacent inner ends of the rollers 98 and 100 include stub axle portions journaled from the rear ends of trailing arms 116 and 118 having their forward ends pivotally supported from the frame 20 as at 120 and 122. Accordingly, the rollers 98 and 100 are supported in a "floating" manner from the frame 12. Further, it will be apparent that the rollers 98 and 100 are driven from the power take off shaft 14 so as to rotate in clockwise directions as viewed from the left side of the frame 20.

Figure 3:
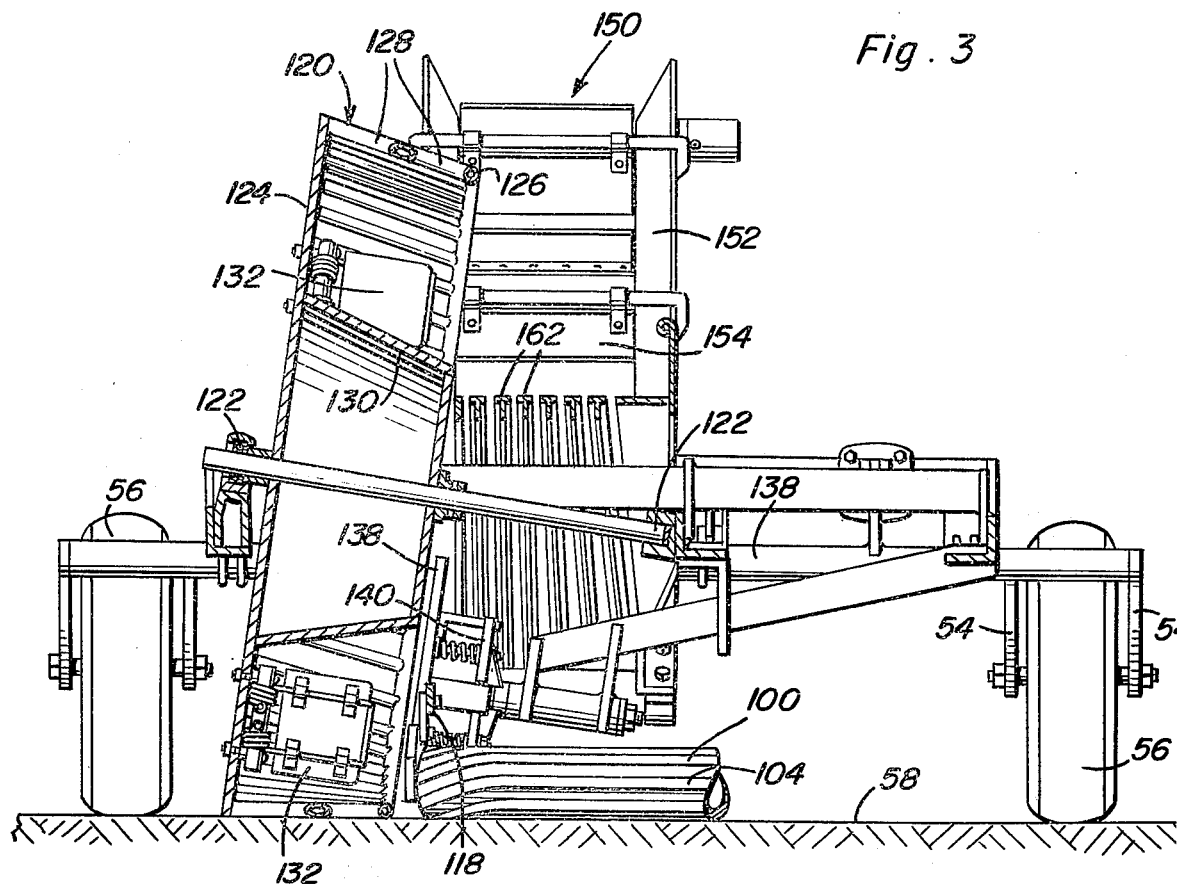
FIG. 3 is an enlarged transverse vertical 1 sectional view taken substantially upon the plane indicated by the section line 3—3 of FIG. 1.
Figure 5:
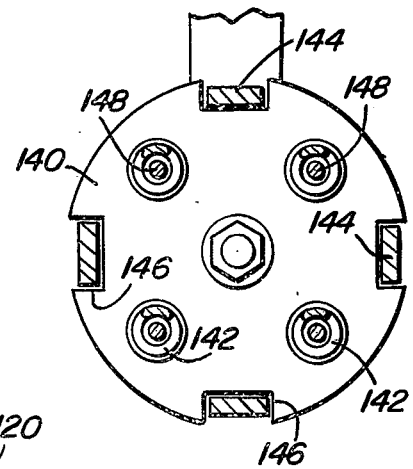
FIG. 5 is a longitudinal sectional view taken substantially upon the plane indicated by the section line 5—5 of FIG. 4.

A large frusto-conical wheel referred to in general by the reference numeral 120 is journaled from the frame 20 as at 122 and the wheel 120 includes a large diameter end plate or end wall 124 and a small diameter end ring 126 with slanted tubular bars 128 extending between the outer periphery of the plate or end wall 124 and the ring 126 to define an outer slotted periphery of the wheel 120. From FIG. 3 of the drawings, it may be seen that the axis of rotation of the wheel 120 is inclined downwardly toward the left side of the frame 20 so that the slant height of the lowermost outer periphery of the wheel generally parallels the ground 58. In addition, it may also be seen from FIG. 3 of the drawings that the plate or end wall 124 closes the major diameter end of the wheel 120 while the minor diameter end of the wheel 120 defined by the ring 126 is open. Also, the center of the interior of the wheel 120 is occupied by a frusto-conical hollow body 130 and the outer peripheral area of the inner portion of the wheel 120 defined between the body 130 and the tubes 128 includes circumferentially spaced pivotally mounted spring biased plates or paddles 132 whereby stones received within the lower periphery of the open minor diameter end of the wheel 128 may be engaged by the plates 132 and elevated to an upper portion of the wheel 120 upon its forward rotation with contact with the ground 58.

Figure 4:
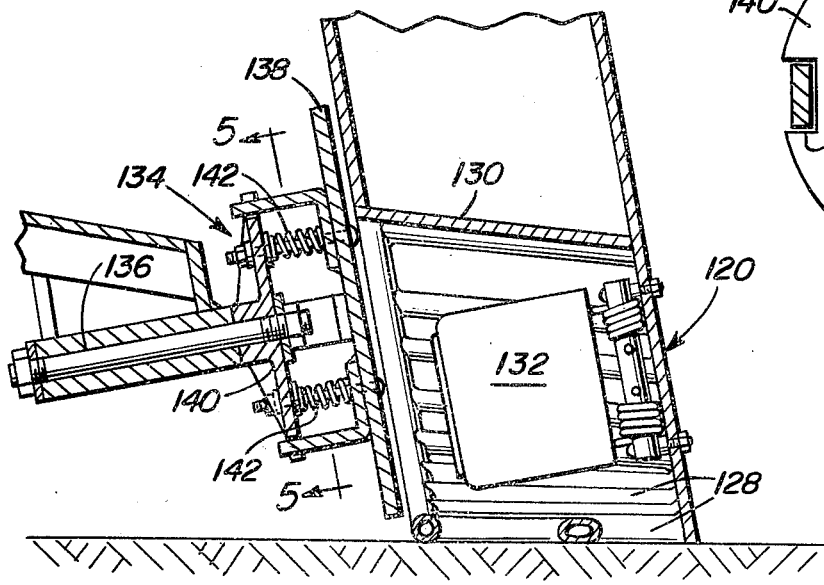
FIG. 4 is an enlarged fragmentary transverse vertical sectional view taken substantially upon the plane indicated by the section line 4—4 of FIG. 1.

A rotary disk assembly referred to in general by the reference numeral 134 is journaled from the frame 20 as at 136 and is disposed closely outwardly of and registered with the rear lower quadrant of the open minor diameter end of the wheel 120. The disc assembly 134 includes a circular plate or disk 138 supported from the hub 140 of the assembly 134 for limited shifting axially of the axis of rotation of the disk assembly 34 and is spring biased, by means of compression springs 142, to its limit position of movement toward the open side of the wheel 120, see FIG. 4. The disk 138 includes peripherally spaced axially extending arms 144 which are slidable in peripherally spaced notches 146 formed in the hub 140 and elongated shank-type fasteners 148 spaced about the center axis of the disk 138 are secured through the latter and the hub 140, the springs 142 being disposed about the fasteners 148 between the disk 138 and the hub 140.

With attention now invited more specifically to FIG. 1 of the drawings, the rear portion of the frame 20 includes a rearwardly and upwardly inclined endless belt conveyor assembly 150 which may be driven in any convenient manner and the conveyor assembly 150 includes stationary upstanding side walls 152. Further, the side walls 152 support a plurality of depending flexible resilient flaps 154. The flaps 154 are provided to prevent larger stones from rolling down the upper reach 156 of the conveyor assembly 150. The fluid motor 50 may be actuated by the hydraulic system of the tractor 10 and the conveyor 150 may be driven by a hydraulic motor (not shown) also powered by the hydraulic system of the tractor 10.

The lower end of the conveyor assembly 150 is disposed to the rear of the wheel 120 and the flaps or plates 132 in the wheel 120 are designed to discharge stones elevated in the wheel 120 from the wheel and onto a rearwardly and downwardly inclined slide assembly referred to in general by the reference numeral 160. The slide assembly 160 includes a plurality of side-by-side T-shaped bars 162 suitably interconnected at their opposite ends by means of transverse members 164 and defining slots 166 therebetween. The T-shaped members 162 are downwardly divergent and have their lower ends overlying the lower end of the rearwardly and upwardly inclined conveyor assembly 150. Accordingly, small stones which may be elevated by the wheel 120 and deposited onto the upper end of the slide assembly 160 may slide down along the latter and fall downwardly through the slots 166 without becoming jammed between the T-shaped members 162.

From FIG. 2 of the drawings, it may be seen that the fluted rolls or shafts 98 and 100 are forwardly divergent with the roll 98 extending outwardly of the closed major diameter end of the wheel 120 and the roll 100 extending outwardly of the minor diameter open end of the wheel 120. The roll 98 serves to engage and windrow stones laying upon the ground 58 inwardly toward the inner side of the wheel 120 and the roll 100 functions to windrow stones inwardly toward the open inner minor diameter side of the wheel 120. Also, the stones discharged from the roll 98 are windrowed inwardly toward the open lower periphery of the wheel 120 by the roll 100. As the stones are discharged into the open lower periphery of the inner side of the wheel 120, they are engaged by the flaps or plates 132 and are thus elevated within the wheel 120 upon rolling movement of the latter over the ground 58. The flaps 132 are somewhat inclined so as to incline the stones elevated thereby outwardly of the open side of the wheel 120 onto the upper end of the slide assembly 160 whereupon the stones will slide downwardly along the slide assembly and onto the lower end of the conveyor assembly 150. Of course, the smaller stones and pebbles fall through the slots 166 back onto the ground.

If any dirt clings to any of the stones discharged into the open side of the wheel 120, most of this dirt tends to fall from the stones as they are discharged from the wheel 120 onto the slide assembly 160. However, further dirt tends to fall from the stones during their sliding and rolling movement down the slide assembly 160. Thus, the stone gatherer is capable of windrowing and gathering stones with the assurance that smaller pebbles and dirt are not also gathered with the stones.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A stone gatherer including a main frame, a hollow generally truncated cone-shaped wheel journaled from said frame for rolling along the ground surface over which said frame is advanced, the major and minor diameter axial ends of said wheel being closed and open, respectively, means supported from said frame for engagement with and laterally deflecting windrowed stones along which said frame is advanced into said open minor diameter end of said wheel, the axis of rotation of said wheel lying in a substantially vertical plane generally normal to the direction of intended movement of said frame and said axis being inclined relative to the horizontal an amount substantially equal to the angle of displacement of the slant height of the wheel relative to the wheel center axis with the lowermost slant height of the wheel horizontally disposed, a rotary disk, support means journaling said disk from said main frame for rotation about an axis generally paralleling the axis of rotation of said wheel and with said disk disposed closely outwardly of and closing the rear lower quadrant portion of the open minor diameter end of said wheel said wheel including circumferentially spaced lift members disposed about and supported from outer peripheral portions of the interior of the wheel for engaging rocks received into the lower periphery of the open minor diameter axial end of said wheel and elevating the engaged rocks upon rotation of said wheel, said support means including means mounting said disk for limited axial shifting along its axis of rotation, and means yieldingly biasing said disk toward its limit position of shifting toward said wheel.

2. The combination of claim 1 wherein said wheel includes a generally frusto-conical outer periphery defining a plurality of dirt and small pebble openings extending therethrough.

3. The combination of claim 1 wherein said interior of said wheel includes a body occupying the central portion thereof and thereby limiting the useful volume of the interior of said wheel to an outer circumferential area of the interior thereof, said lift members being spaced about said outer circumferential area.

4. A stone gatherer including a main frame, a hollow generally truncated cone-shaped wheel journaled from said frame for rolling along the ground surface over which said frame is advanced, the major and minor diameter axial ends of said wheel being closed and open, respectively, means supported from said frame for engagement with and laterally deflecting windrowed stones along which said frame is advanced into said open minor diameter end of said wheel, the axis of rotation of said wheel lying in a substantially vertical plane generally normal to the direction of intended movement of said frame and said axis being inclined relative to the horizontal an amount substantially equal to the angle of displacement of the slant height of the wheel relative to the wheel center axis with the lowermost slant height of the wheel horizontally disposed, said wheel including circumferentially spaced lift members disposed about and supported from outer peripheral portions of the interior of said wheel for engaging rocks received into the lower periphery of the open minor diameter axial end of said wheel and elevating the engaged rocks upon rotation of said wheel, said interior of said wheel including a body occupying the central portion thereof and thereby limiting the useful volume of the interior of said wheel to an outer circumferential area of the interior thereof, said lift members being spaced about said outer circumferential area.

5. The combination of claim 4 wherein said wheel includes a generally frusto-conical outer periphery defining a plurality of dirt and small pebble openings extending therethrough.

6. The combination of claim 4 wherein said body comprises a frusto-conical body with its major and minor diameter ends corresponding to the major and minor diameter ends of said wheel.

7. The combination of claim 1 including an inclined longitudinally slotted slide supported from said frame with its upper end positioned to receive stones elevated in said wheel and subsequently discharged therefrom out of the upper rear quadrant thereof, said slide including means defining a plurality of longitudinally extending transversely spaced slots.

8. The combination of claim 7 wherein said slots taper in width toward the upper end of said slide.

9. The combination of claim 8 wherein said slots are defined by downwardly divergent T-shaped bars extending longitudinally of said slide.

10. The combination of claim 7 including an inclined endless conveyor supported from said main frame and having its lower stone receiving end positioned to receive stones sliding off the lower end of said slide.

11. The combination of claim 10 wherein said endless conveyor includes upper and lower reaches, said conveyor including dependingly supported flexible panels supported above said upper reach at points spaced therealong and including lower transverse marginal edges spaced at least closely adjacent said upper reach and extending transversely thereof.

12. The combination of claim 1 wherein said lift members include panels disposed in generally radial planes of said wheel and pivotally supported from the closed end of said wheel for oscillation about axes extending generally radially of said wheel, said panels being spring biased toward positions disposed generally normal to radii of said wheel normal to radial planes.

* * * * *